(12) United States Patent
Drew et al.

(10) Patent No.: US 8,745,265 B2
(45) Date of Patent: Jun. 3, 2014

(54) INTERCONNECTION FABRIC CONNECTION

(75) Inventors: Julie Ward Drew, Redwood City, CA (US); John Wilkes, Palo Alto, CA (US); Charles O'Toole, Northboro, MA (US); Douglas Hagerman, Worcester, MA (US); Simge Kucukyavuz, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 13/443,356

(22) Filed: Apr. 10, 2012

(65) Prior Publication Data

US 2012/0198093 A1     Aug. 2, 2012

Related U.S. Application Data

(63) Continuation of application No. 10/874,128, filed on Jun. 22, 2004, now Pat. No. 8,214,523.

(51) Int. Cl.
     *G06F 15/173*      (2006.01)

(52) U.S. Cl.
     USPC ......................................................... 709/238

(58) Field of Classification Search
     USPC ......................................................... 709/238
     See application file for complete search history.

*Primary Examiner* — Maceeh Anwari

(57) ABSTRACT

Link used variables are defined for links related to an interconnection fabric. The links used variables are representative of whether or not a link is used for handling flows between a plurality of hosts and devices. Constraints for links, and hop counts or port counts are also defined. An objective function is used by an integer programming solver to determine connections as a function of the definitions.

13 Claims, 3 Drawing Sheets

| | DEVICE 1 | DEVICE 2 |
|---|---|---|
| HOST 1 | 40 MBps (F1) | |
| HOST 2 | 40 MBps (F2) | 100 MBps (F6) |
| HOST 3 | 40 MBps (F3) | |
| HOST 4 | 40 MBps (F4) | |
| HOST 5 | 40 MBps (F5) | 100 MBps (F7) | ent
INTERCONNECTION FABRIC CONNECTION

CROSS-REFERENCE TO RELATED APPLICATIONS

This application is a continuation of U.S. application Ser. No. 10/874,128 filed Jun. 22, 2004, now U.S. Pat. No. 8,214,523 U.S. Publication No. 2006/0080463, the disclosure of which is hereby incorporated by reference.

FIELD

The present invention relates to interconnection fabrics, and in particular to connection of interconnection fabrics.

BACKGROUND

An interconnection fabric is a set of communication lines and intermediate nodes between a given set of source nodes to a given set of terminal nodes, such as storage devices. Interconnection fabrics can be implemented as storage area networks. A storage area network (SAN) is a high-speed special-purpose network or sub network that interconnects data storage devices with associated data servers on behalf of a larger network of users. Typically, a storage area network is part of the overall network of computing resources for an enterprise. The SAN includes the interconnection fabric and the source and terminal nodes, as well as links from source and terminal nodes to the fabric. Targets may act as sources, and sources may act as targets in some SANs.

The interconnection fabric typically comprises switches and hubs, and links between the switches and hubs. Data flows through the interconnection fabric between the source nodes and terminal nodes. There may be predetermined flow requirements between such nodes that the interconnection fabric should be capable of handling. There is a desire to determine how to connect the source nodes and terminal nodes to the interconnection fabric in a manner that handles such flow requirements in a desired manner.

DETAILED DESCRIPTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figures 1, 2:
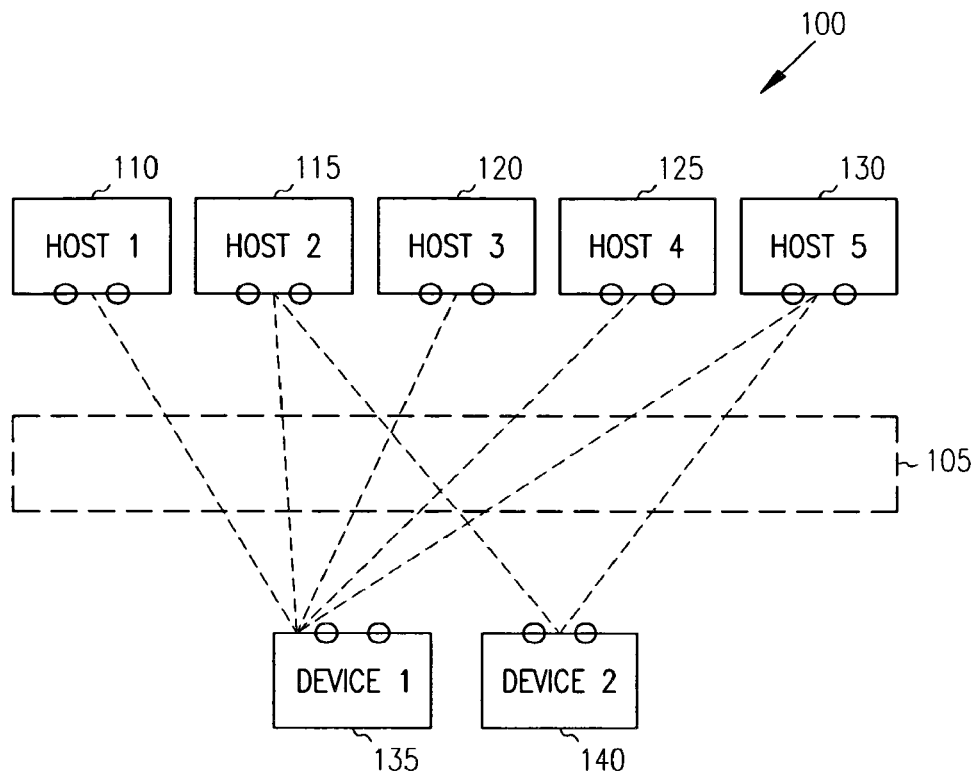
FIG. 1 is a block diagram of hosts and devices to be connected to an interconnection fabric according to an example embodiment.
FIG. 2 is a chart showing flow requirements for the hosts and devices of FIG. 1 according to an example embodiment.

A system in FIG. 1, indicated generally at 100 is representative of a typical set of terminals to be coupled by an interconnection network indicated by broken line 105. In this simplified example embodiment, hosts, such as host 1 indicated at 110, host 2 indicated at 115, host 3 indicated at 120, host 4 indicated at 125 and host 5 indicated at 130 are to be selectively coupled to device 1 indicated at 135 and device 2 indicated at 140. In one embodiment, the devices are storage devices, and the hosts are computer systems, such as personal computers and servers. This type of system, including the interconnection network 105, is commonly referred to as a storage area network (SAN). Many more hosts and devices may be connected in further embodiments.

There are many different ways in which the hosts and devices may be connected to the interconnection fabric. The desire is to determine how such connections should be made to make efficient use of the interconnection fabric. Variables and constraints related to the hosts, devices and interconnection fabric are identified and encapsulated in a mathematical language to create an integer program representation of the connection problem.

The integer program is then fed into an integer programming solver to provide an output identifying a desirable solution. The solver automatically determines the connectivity of host and device nodes to the interconnection topology, and the routing of flows through the resulting network to minimize congestion and latency of flows if a feasible solution to the connectivity/routing problem exists. It can also automatically determine which parts of the given interconnection topology to exclude in order to minimize hardware costs. The connectivity provided by the solution can be cost-effective and provide low latency.

In one interconnection problem example, each host and device is defined as having two ports, each with a bandwidth of approximately 200 Mbps (megabits per second). Lines are shown between selected hosts and devices in one embodiment. Each line indicates a flow requirement between a host and a device pair that needs to be connected via the fabric 105. A flow requirement is represented by a number of megabits per second. The flow requirement may be specified based on expected requirements by a designer of a system, or may be predetermined based on host and device capacities.

Example flow requirements for the system 100 are indicated in a multi-cell table in FIG. 2 at 200. Each cell indicates a flow requirement between a host and device pair. Device 1 at 135 has a flow to each of the hosts of 40 MBps (megabytes per second). The flows are referred to as F1, between host 1 and device 1, F2 between host 2 and device 1, F3 between host 3 and device 1, F4 between host 4 and device 1, and F5 between host 5 and device 1. Further flows of 100 MBps, are referred to as F6 between host 1 and device 2, and F7 between host 5 and device 2.

Figure 3:
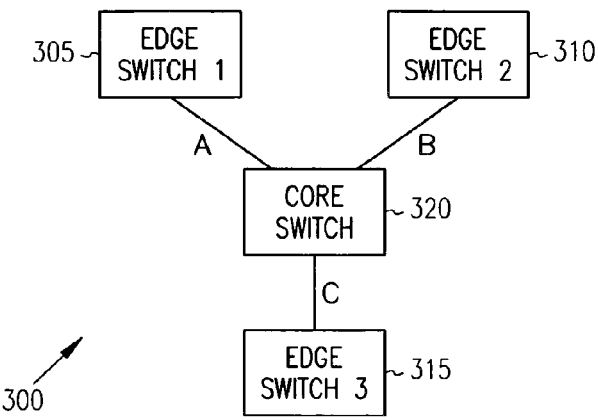
FIG. 3 is a block diagram showing the interconnection fabric of FIG. 1 according to an example embodiment.

FIG. 3 is an example connection fabric 300. Example connection fabric 300 is a simplified example comprising three edge switches, switch 1 at 305, switch 2 at 310 and switch 3 at 315, and a core switch at 320. In further embodiments, many more edge switches and core switches may be used such that flows may progress through multiple levels of core switches. Further embodiments may utilize hubs or other types of routing devices.

The switches in connection fabric 300 comprise multiple ports and links between ports, each having a bandwidth of 200 MBps. Each switch has a total bandwidth of 800 MBps and four ports. In further embodiments, different switches in the interconnection fabric may have more or fewer ports with different bandwidths.

Figure 4:
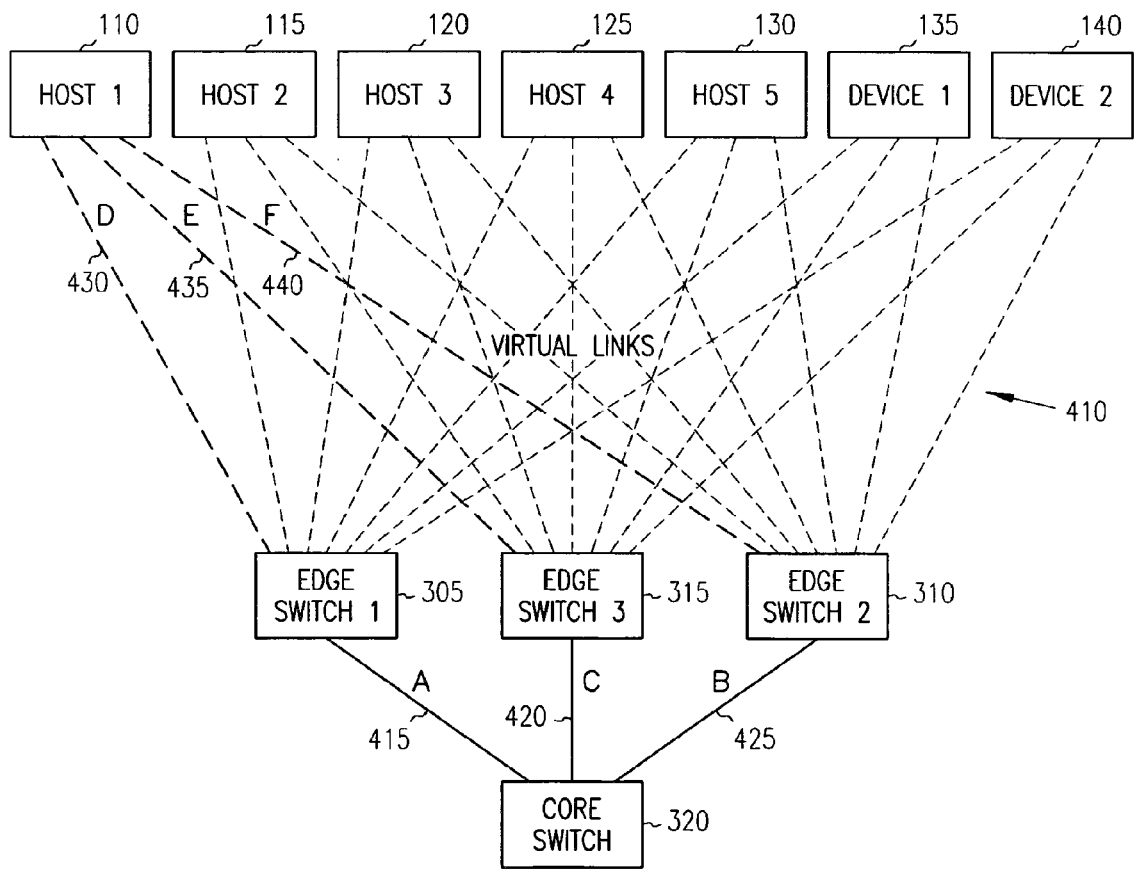
FIG. 4 is a block diagram of hosts and devices coupled to an interconnection fabric according to an example embodiment.

FIG. 4 is a block diagram of system 100, coupled by virtual links indicated generally at 410, to edge switches 305, 310 and 315. The virtual links represent candidate or potential links that can be considered during connection configuration, but do not exist physically. Links 415, 420 and 425 are physical links between the switches that exist in the interconnection fabric. Links 415 labeled "A" and 425 labeled "B" represent flow between edge switch 1 at 315 and edge switch 2 at 310 and the core switch 320. Link 420 labeled "C" represents flow between edge switch 3 at 315 and core switch 320. A link is referred to as an ordered pair of nodes (i,j). For example, link 415 can be described as (edge switch 1 305, core switch 320). Alternatively, link 415 can be described as (core switch 320, edge switch 1 305). The choice of which description is used is arbitrary, but it should be consistent for the later purpose of defining variables. Flow can travel in both directions along any link.

Three of the virtual links 410 are represented by darker broken lines 430, 435 and 440 for later reference with respect to defining constraints. Link 430, labeled "D" represents a potential connection between host 1 110 and edge switch 1 305. Link 435, labeled "E" represents a potential connection between host 1 110 and edge switch 3 at 315. Link 440, labeled "F" represents a potential connection between host 1 110 and edge switch 2 at 310.

Figure 5:
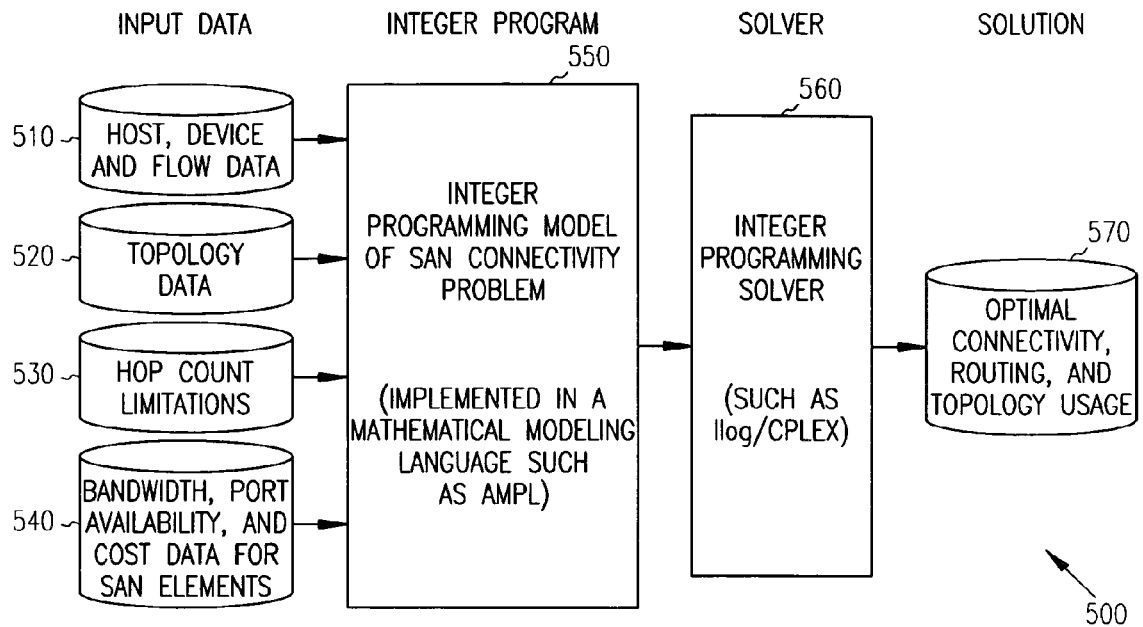
FIG. 5 is a block flow diagram of a method for determining connectivity and routing for an interconnection fabric according to an example embodiment.

An integer programming formulation of the connectivity problem is created in a mathematical modeling language such as AMPL. AMPL is a language that allows the writing of variables, constraints and objective function of an integer program in a language that a computer can execute. Any other mathematical language may also be used. The model data is drawn from user inputs shown in FIG. 5, which is a block diagram of a method 500 for optimizing connectivity to and routing in the interconnection fabric.

User inputs in one embodiment comprise host, device and flow data 510, a characterization of the network topology or fabric to which hosts and devices will be connected at 520, limitations on hop counts that may be imposed at 530 and bandwidth, port availability, and cost data for system devices at 540. The user inputs are used to create an integer programming model of the system connectivity problem at 550.

The integer program consists of a set of decision variables, an objective function, and a set of constraints. The decision variables represent the decisions that the solver is attempting to make. The objective function represents the goal of the model, i.e., the metric to be minimized or optimized. The constraints represent the rules that a decision should obey in order to be valid. This model is provided to an integer programming solver at 560. One example of such a solver is Ilog/CPLEX, but other solvers may also be utilized. The solver provides a solution indicated at 570, which provides connectivity, routing and topology usage information to provide sufficient guidance in configuring the system to connect the hosts and devices to the interconnection fabric.

The decision variables in one embodiment include, flow-using-a-link decision variables. For each flow requirement and for each link, a binary flow-using-a-link decision variable is equal to one if the flow travels forward along the link, and zero otherwise. Another binary flow-using-a-link decision variable is equal to one if the flow travels backward along the link, and zero otherwise. For a link between nodes i and j that is referred to as (i,j), flow is said to travel forward if it travels from node i to j. It is said to travel backwards if it travels from j to i. It should be noted that the actual integer values assigned may differ in different models. For each link, a decision variable includes a binary link-used variable equal to one if that link is used, and equal to zero, if instead, the link is unused, and therefore excluded from the topology. For each node, a binary decision variable is equal to one if that node is used, and equal to zero if instead, the node is unused and therefore excluded from the topology.

In one embodiment an objective function of the integer program is to minimize the total hops taken by the flows, weighted by their respective bandwidths. The corresponding objective function is the sum, over the flows, of the bandwidth of the flow times the number of links used by the flow. The objective function can be generalized to reflect that some flows may have a higher priority than others. For example, if flows originating at a particular storage device should have the lowest possible latency, one can apply a large positive multiplicative penalty in the objective function to the latency of those flows such that the flows are prioritized. Another objective function in a further embodiment is used to minimize the maximum difference between flow routed through two switches. This objective function achieves load balancing in the solution.

Constraints that are available for use in the integer program or model are selected from the following set of constraints. A constraint is defined such that the total flow across a link should be less than the link's bandwidth and the bandwidth of the ports on either end of the link.

A further constraint, is defined such that the flow through a node should be less than the bandwidth, if that node is used. If the node is unused, the flow through it should be zero. The nodes' bandwidth may vary.

A further constraint is defined such that the volume of each flow through a component (switch, hub, host or device) is conserved. If the component is a switch or hub, the outgoing volume of a given flow on links should equal the incoming volume. If instead the component is a host (respectively, device) and is the source (respectively, destination) of the flow, then the outgoing flow (respectively, incoming flow) should equal the flow's required bandwidth.

For every component to which a hub is connected, a constraint is defined such that the total flow through that hub should be less than the bandwidth of the hub's own port, the other component's port, and the link between the hub and the component. This depends on an underlying assumption that number of links between a hub and any other component is at most 1. This constraint is due to the special bandwidth limitations of hubs in that all ports on a hub propagate the same data.

A constraint is defined such that the number of links into a component should be less than its port count. The port counts may vary from component to component. A constraint is also defined such that the hop count for a particular flow should be less than its maximum allowed hop count. Note that the maximum hop count can vary from flow to flow. Thus, if there are particular flows for which very low hop counts are desired, this can be modeled through the maximum hop count parameter used in this constraint.

A constraint is defined such that for a given flow requirement, the sum of the forward and backward flow-using-a-link decision variables for that link is less than or equal to the link-used decision variable for that link. This constraint is called a strengthening cut because, although it is redundant with the link bandwidth constraint, it strengthens the linear programming relaxation of the integer program, and speeds up the solution time.

The following example uses a few selected constraints and variables to illustrate a simple connectivity problem. A constraint, Link bandwidth, for the virtual link D at 430 is represented by the total flow (in both directions) across link D being less than or equal to its bandwidth (200 MBps). Flows are represented by the letter "F#" as in FIG. 2, with the "#" symbol representing a corresponding number of the flow, and the links are represented by the letters "A, B, C, D, E and F". The constraint is represented as follows:

$$(\text{Forward\_Flow}[D, F1] + \text{Backward\_Flow}[D, F1]) * 40 \text{ MBps} +$$
$$(\text{Forward\_Flow}[D, F2] + \text{Backward\_Flow}[D, F3]) * 40 \text{ MBps} +$$
$$(\text{Forward\_Flow}[D, F3] + \text{Backward\_Flow}[D, F3]) * 40 \text{ MBps} +$$
$$(\text{Forward\_Flow}[D, F4] + \text{Backward\_Flow}[D, F4]) * 40 \text{ MBps} +$$
$$(\text{Forward\_Flow}[D, F5] + \text{Backward\_Flow}[D, F5]) * 40 \text{ MBps} +$$
$$(\text{Forward\_Flow}[D, F6] + \text{Backward\_Flow}[D, F6]) * 100 \text{ MBps} +$$
$$(\text{Forward\_Flow}[D, F7] + \text{Backward\_Flow}[D, F7]) *$$
$$100 \text{ MBps} <= 200 \text{ MBps}$$

A Node bandwidth constraint for the core switch requires that the total flow out of the core switch is less than or equal to its bandwidth (800 MBps). The constraint is expressed as follows:

$$\text{Forward\_Flow}[C, F1] * (40 \text{ MBps}) + \text{Forward\_Flow}[C, F2] * (40 \text{ MBps}) +$$
$$\text{Forward\_Flow}[C, F3] * (40 \text{ MBps}) +$$
$$\text{Foward\_Flow}[C, F4] * (40 \text{ MBps}) +$$
$$\text{Forward\_Flow}[C, F5] * (40 \text{ MBps}) +$$
$$\text{Forward\_Flow}[C, F6] * (100 \text{ MBps}) +$$
$$\text{Forward\_Flow}[C, F7] * (100 \text{ MBps}) +$$
$$\text{Backward\_Flow}[A, F1] * (40 \text{ MBps}) +$$
$$\text{Backward\_Flow}[A, F2] * (40 \text{ MBps}) +$$
$$\text{Backward\_Flow}[A, F3] * (40 \text{ MBps}) +$$
$$\text{Backward\_Flow}[A, F4] * (40 \text{ MBps}) +$$
$$\text{Backward\_Flow}[A, F5] * (40 \text{ MBps}) +$$
$$\text{Backward\_Flow}[A, F6] * (100 \text{ MBps}) +$$
$$\text{Backward\_Flow}[A, F7] * (100 \text{ MBps}) +$$
$$\text{Backward\_Flow}[B, F1] * (40 \text{ MBps}) +$$
$$\text{Backward\_Flow}[B, F2] * (40 \text{ MBps}) +$$
$$\text{Backward\_Flow}[B, F3] * (40 \text{ MBps}) +$$
$$\text{Backward\_Flow}[B, F4] * (40 \text{ MBps}) +$$
$$\text{Backward\_Flow}[B, F5] * (40 \text{ MBps}) +$$
$$\text{Backward\_Flow}[B, F6] * (100 \text{ MBps}) +$$
$$\text{Backward\_Flow}[B, F7] * (100 \text{ MBps}) <= 800 \text{ MBps}$$

A Flow Conservation constraint for the core switch and flow F1 requires that the amount of Flow F1 that goes into the core switch equals the amount that goes out. The constraint is represented as follows:

$$\text{Forward\_Flow}[C, F1] * (40 \text{ MBps}) +$$
$$\text{Backward\_Flow}[A, F1] * (40 \text{ MBps}) +$$
$$\text{Backward\_Flow}[B, F1] * (40 \text{ MBps}) =$$
$$\text{Backward\_Flow}[C, F1] * (40 \text{ MBps}) + \text{Forward\_Flow}[A, F1] *$$
$$(40 \text{ MBps}) + \text{Forward\_Flow}[B, F1] * (40 \text{ MBps})$$

A Port Limit constraint for host 1 requires that the total number of (existing+created) links that are incident to host 1 should be less than or equal to its port count (2). The constraint is expressed as follows:

LinkUsed[D]+LinkUsed[E]+LinkUsed[F]<=2

Link Usage constraints for link D requires that if any of the flows (F1 through F7) uses link D, then LinkUsed[D] should equal 1. It is expressed as follows:

(Forward_Flow[D,F1]+Backward_Flow[D,F1])
<=LinkUsed[D];

(Forward_Flow[D,F2]+Backward_Flow[D,F2])
<=LinkUsed[D];

(Forward_Flow[D,F3]+Backward_Flow[D,F3])
<=LinkUsed[D];

(Forward_Flow[D,F4]+Backward_Flow[D,F4])
<=LinkUsed[D];

(Forward_Flow[D,F5]+Backward_Flow[D,F5])
<=LinkUsed[D];

(Forward_Flow[D,F6]+Backward_Flow[D,F6])
<=LinkUsed[D];

(Forward_Flow[D,F7]+Backward_Flow[D,F7])
<=LinkUsed[D];

In one embodiment, a single flow requirement, referred to as a commodity, does not have both a backward and forward flow along a single link in an optimal solution to the interconnection problem. However, some commodities may be going forward, and others going backward. The constraint considers one commodity at a time in accordance with an integer programming formulation.

Figure 6:
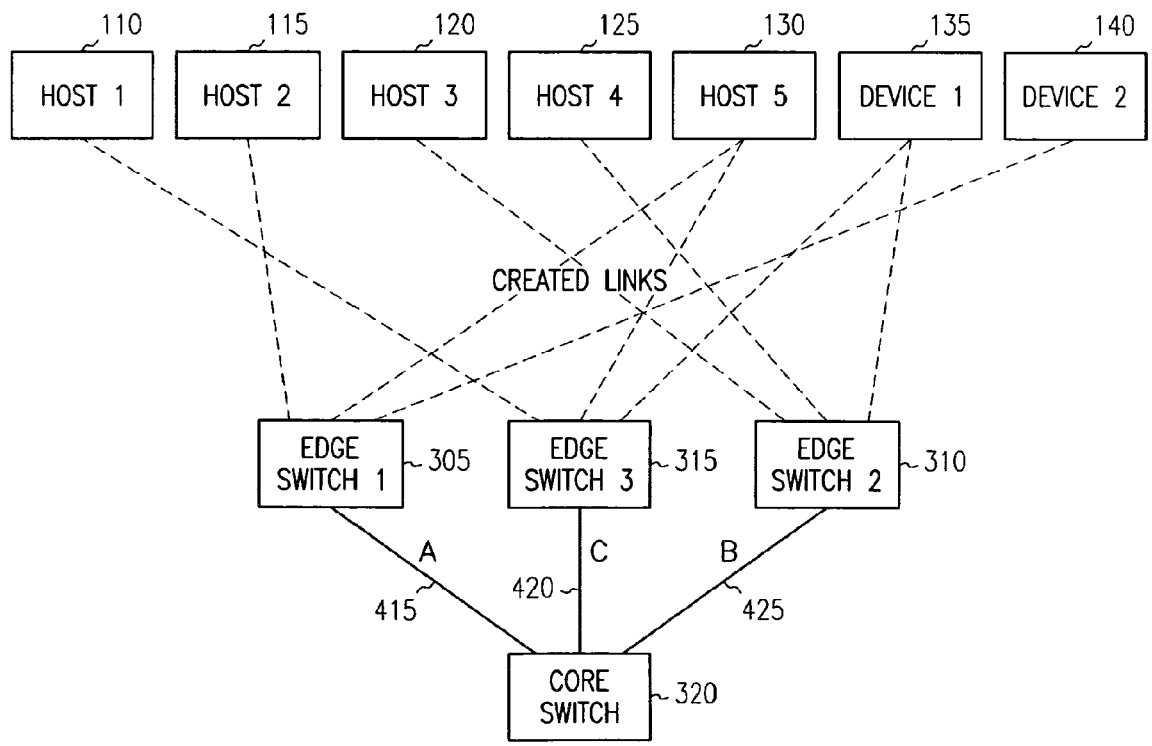
FIG. 6 is a block diagram of an example solution provided by the block flow diagram of FIG. 5 according to an example embodiment.

FIG. 6 is a block diagram representing an example solution for the example connectivity problem. A total weighted hop count is 880 hop-MBps. In this example solution, host 1 at 110, host 5 at 130 and device 1 at 135 are coupled to edge switch 3 at 315. Host 2 at 115, host 5 at 130 and device 2 at 140 are coupled to edge switch 1 at 305. Host 3 at 120, host 4 at 125 and device 1 at 135 are coupled to edge switch 1 at 310. The flow F2 from host 2 at 115 to device 1 at 135 of 40 MBps is routed along a link between host 2 at 115 and edge switch 1 at 305, and a link between edge switch 1 at 305 and device 2 at 140. The flow F6 from host 2 at 115 to device 2 at 140 of 100 MBps is routed along a link between host 2 at 115 and edge switch 1 at 305, link A at 415 to core switch 320, link C at 420 to switch 3 at 315 and finally a link between edge switch 3 at 315 to device 2 at 140.

In further embodiments, additional constraints may be used, such as forcing the integer program to leave a specified number or percentage of empty ports on each switch. Certain switches can be specified to not connect to hosts and devices, such as the core switch connecting only to other edge switches. This is indicated by the fact that there are no candidate links from hosts and devices to the core switch. Some switches can be forced to have only hosts, or only devices attached to them.

Through the mathematical constraints of the integer program, it can be required that solutions have a number of desirable properties, such as a limit to the hop count for a flow, and balanced bandwidth allocation across network devices. Through the objective function, it can be ensured that a solution minimizes the total hop count of all flows, weighted by their bandwidth, so as to provide minimum overall latency.

The method of representing the connectivity problem as an integer program can be applied to solve geographically distributed network connectivity problems. In some embodiments, the host and devices which are to be connected through the topology are distributed among several different physical sites. In such situations, it may be desirable to limit the number of cables that cross sites, since long cables are expensive to install and manage.

In order to limit intersite cables, a "boundary switch" may be installed for each site (or a pair of such boundary switches or hubs). For a given site, flows originating at the hosts and devices within the site and terminating at other sites would be routed through the site's boundary switch. In the network connectivity problem, each boundary switch(es) would act as the host and/or device node for the flows going in or out of its site. In this context, the links between boundary switches and the network fabric nodes may be long-distance cables. Such cables may have more limited bandwidth, higher latency, higher cost, or some combination of these attributes. These limitations may be reflected in the parameters of the integer program.

In a further embodiment the integer program model is used to reprovision an existing SAN design to accommodate new host and device nodes and/or new or modified flow requirements. In this context, the existing part of the network connectivity and routing is considered to be fixed. The connections and routing of the newly added nodes and flows are optimized without changing the existing part of the network connectivity and routing. Still more generally, some modifications to the installed parts are subject to a penalty. The penalty then becomes part of the problem objective function to minimize.

A further extension involves creating a process to monitor the network topology after it has been built. The integer program is then coupled with the monitoring process in a feedback loop. The monitoring process records the actual traffic patterns running in the network, since they may differ from the predicted traffic that was used as input for the integer program. If the actual traffic differs significantly from the predicted traffic, and adversely impacts the latency or load balancing, then the integer program is applied again to reprovision the existing connectivity and routing with respect to the new traffic measurements.

The invention claimed is:

1. A method comprising:
generating an integer program identifying a set of hosts and devices to be connected by an interconnection fabric;
defining decision variables of the integer program for links in the interconnection fabric and for data flows along the links, wherein the decision variables include binary link used variables that each has one of two binary values depending upon whether the corresponding one of the links is used or unused;
weighting the flows as a function of respective bandwidths of the flows; and
solving, by a computer system, the integer program to minimize total hops taken by the flows, weighted by the respective bandwidths.

2. The method of claim 1, further comprising generating an output representing a connectivity of the hosts and the devices to a given interconnect topology for the interconnection fabric.

3. The method of claim 2, wherein the flows are between the hosts and devices through the interconnection fabric.

4. The method of claim 1, wherein a selected one of the flows is prioritized by applying a larger weight to it.

5. The method of claim 1, further comprising defining constraints comprising bandwidth limitations for the integer program.

6. The method of claim 1, further comprising defining, for the integer program, a port limit constraint for a host or device.

7. The method of claim 1, further comprising defining a hop count limitation constraint in an integer programming language.

8. The method of claim 1, further comprising:
defining an objective function that reduces a value based on an aggregate, over the flows, of the bandwidth of each respective flow times a number of hops used by the respective flow,
wherein solving the integer program considers the objective function.

9. A non-transitory computer readable medium having an integer program stored thereon for determining connection of hosts and devices to an interconnection fabric having links for handling flows between the hosts and devices, the program comprising:
for each flow and for each link in the interconnection fabric, a binary variable having a different value depending on whether or not the flow travels along the link;
for each link, a binary variable having a different value depending on whether the link is used or unused;
a plurality of constraints representative of physical limitations of the interconnection fabric, including a port limit constraint; and
an expression of an objective function to be optimized, wherein the objective function reduces an aggregate, over the flows, of a bandwidth of each corresponding flow times a number of hops used by the corresponding flow.

10. The computer readable medium of claim 9, wherein the plurality of constraints further include constraints for links in the interconnection fabric, the constraints for links comprising bandwidth limitations.

11. The computer readable medium of claim 9, wherein the plurality of constraints further include constraints for links in the interconnection fabric, the constraints for links comprising an amount of flow that a switch in the interconnection fabric can handle.

12. The computer readable medium of claim 9, wherein the port limit constraint is representative of port limits for a host or a device.

13. The computer readable medium of claim 9, wherein the objective function minimizes a sum, over the flows of the bandwidth of each corresponding flow times the number of hops used by the corresponding flow.

* * * * *